May 14, 1968 M. A. LEWIS 3,383,578

CONTINUOUS MODE MOTOR SPEED CONTROL SYSTEM

Filed Oct. 26, 1964 3 Sheets-Sheet 1

INVENTOR.
MARTYN A. LEWIS

BY Robert G. Clay

ATTORNEY

INVENTOR.
MARTYN A. LEWIS

BY Robert D. Clay
ATTORNEY

CONTINUOUS MODE MOTOR SPEED CONTROL SYSTEM

Filed Oct. 26, 1964 3 Sheets-Sheet 3

INVENTOR
MARTYN A. LEWIS

BY Robert G. Clay

ATTORNEY

United States Patent Office 3,383,578 Patented May 14, 1968

3,383,578

CONTINUOUS MODE MOTOR SPEED CONTROL SYSTEM

Martyn A. Lewis, Los Angeles, Calif., assignor to Ampex Corporation, Redwood City, Calif., a corporation of California Filed Oct. 26, 1964, Ser. No. 406,331
14 Claims. (Cl. 318—332)

ABSTRACT OF THE DISCLOSURE

This invention relates to a speed control system for direct current motors and more particularly to a system for closely controlling the transient and steady state modes of operation. The system provides substantially constant current during the transient mode and substantially constant voltage during the steady state mode.

It is necessary in many modern applications to drive a motor, such as one used in transporting a magnetic tape, in a controlled fashion through an arbitrary sequence of bidirectional movements. In addition to maintaining the speed of the tape at a selected nominal velocity, such systems must also provide precise start-stop characteristics at high accelerative rates. A good example of the particular requirements which must be met by motor drive systems is found in present day magnetic tape transport systems of the kind used for digital data processing applications. Such systems must operate on demand with high speed data processing systems and must exhibit a great degree of precision in all respects during high speed operation. Therefore, the present description will proceed with relation to such tape transport systems. Like requirements are to be found in a number of motor drive systems other than those concerned with magnetic tape applications, however, and the invention should be considered to be applicable to all such systems.

While previous magnetic tape transports of the contra-rotating capstans type generally have been capable of providing the necessary high performance, they have not proven completely satisfactory. Most previous systems have been complex and expensive, have required high power levels to provide the pulses needed for sudden activation of the selected drive mechanism, have subjected the tape to large tension impulses in accelerating it to full speed, and have lacked predictable start-stop characteristics. Unpredictable start-stop characteristics are of particular importance because they may impose large inter-record gaps in the recorded data, and lengthen the start-stop times, affect the data density and the effective data transfer rate. Vacuum or pneumatic actuator mechanisms may be used to minimize wear, and forces acting on the tape, but these greatly complicate the system mechanism.

The aforementioned problems are substantially eliminated in a new type of magnetic tape transport that is more fully described in connection with the copending applications of Robert A. Kleist entitled "Drive System for Tape Transport Systems," Ser. No. 267,175, and Robert A. Kleist and Ben C. Wang entitled "Magnetic Tape Transport System," Ser. No. 268,140, both assigned to the assignee of the present invention. The transports described in these copending applications employ a single drive capstan coupled directly to the rotor of a reversible drive motor. The drive capstan is in constant engagement with the tape; the tape is maintained in a low friction, relatively low tension path through the tape transport. The tape path is so arranged as to provide a large angle of tape wrap around the capstan in order to eliminate slip between the capstan and tape. The tension of the tape is maintained low and substantially equal on both sides of the capstan, but is sufficiently high to draw the tape from the capstan during acceleration. Controlled acceleration and deceleration characteristics may be imparted to the tape solely by electrical control in starting and stopping the capstan drive motor. Therefore, the effectiveness of this type of system requires, among other things, accurate control of the acceleration and deceleration of a motor used for a capstan drive, and subsequent maintenance of the motor at the selected nominal velocity, all in response to applied command signals available from a data processing or other system.

A drive circuit for energizing a capstan drive motor for use in the foregoing tape transport, and thus providing capstan velocity and acceleration control, is described in connection with a copending application of Martyn A. Lewis entitled "Motor Drive Circuits," Ser. No. 267,166, also assigned to the assignee of the present invention. The system there generally described employs a low inertia motor energized by a saturable amplifier. The saturable amplifier provides a large constant current during the acceleration of the motor to or from a speed near full speed; additionally, when the motor speed is only slightly less than full speed, the amplifier provides a current proportional to the difference between actual motor speed and full speed. Thus, this system employs a constant current during acceleration until a major proportion of full speed is attained, and motor speed feedback control thereafter. The closeness of control depends to a large extent on the response time of the feedback system. An alternative system in which the servo does not saturate, but is given by a ramp generator is also described. This system is under servo control during transient and steady state. The performance so far as predictable start-stop characteristics are concerned, depends entirely on servo system bandwidth. Control circuits of very high bandwidth, while enabling rapid and closely controlled tape movement during start and stop, are sensitive to oscillations in the motor-capstan-tachometer train. Torsional oscillations of the motor-capstan-tachometer assembly are caused by the compliance of the shaft connecting the motor to the tachometer and capstan, together with the inertias of the motor, tachometer, and capstan. This forms a resonant mechanical system which manifests itself as a resonance in the output voltage of the tachometer. Additionally, noise produced by the tachometer, e.g., brush noise, will be followed by a high bandwidth servo as if it were a command. The oscillatory and noisy output of the tachometer is fed back to the control circuit and changes the motor drive current accordingly, thus introducing an increasing oscillatory motor motion, and also a motion related to the tachometer noise. Beyond a certain servo bandwidth, then, it becomes impractical to produce a servo of the ramp generator, tachometer feedback variety. A motor drive system which enables bidirectional motor rotation with high rates of acceleration and deceleration, but which maintains even and accurately controlled constant speed operation, is required for effective operation under high performance conditions of the single capstan drive tape transport system.

The motor used for these high performances will generally be of the basket type armature construction having the highest torque per unit current per unit armature inertia. This motor suffers a higher armature inductance than the planar rotor motor used in the lower performance servos.

Therefore, it is an object of the present invention to provide improved motor drive systems for driving a motor bidirectionally at a selected nominal speed with closely controlled start and stop characteristics.

Another object is to provide an improved motor drive circuit for driving a motor of low inertia with closely controlled and rapidly alterable acceleration characteristics, and which also exhibits smooth and oscillation-free nominal speed characteristics.

A further object is to provide an improved motor drive system for driving a motor with start-stop acceleration characteristics which are rapidly alterable as a function of actual motor speed, and with full speed characteristics which are substantially free of motor speed variations.

Yet another object is to provide an improved magnetic tape transport system for intermittent, bidirectional operation, which system is characterized by simplicity of design, rapid and predictable start-stop characteristics, and uniform and accurately controlled constant speed operation.

A yet further object is to provide an improved simple magnetic tape transport system exhibiting rapid start-stop characteristics and uniform constant speed operation independent of motor or ambient temperature variations.

These and other objects of the present invention are realized in a motor drive system including circuitry for receiving command signals and providing closely controlled starting, stopping and continuous speed energizing current for bidirectional movement of a motor. In response to control commands, a substantially constant magnitude current is provided by the motor drive circuit to the windings of the motor. This current accelerates or decelerates the motor to a point near the desired velocity, either nominal speed or zero speed. At this point, according to a DC tachometer signal, the motor current is forcefully and rapidly decreased or increased to a value which maintains the desired speed. The point at which current adjustment is begun is so chosen that, at the rate of current change obtaining, the motor acquires approximately the desired speed at the same time as the current has changed to approximately the final desired value. When full speed is reached, the motor energization is maintained constant by use of an appropriate regulated voltage independent of rapid tachometer signals change.

A specific example of a system constructed in accordance with the invention includes a motor of low inertia having a substantially linear torque-current characteristic over a relatively wide range. The motor is directly coupled to the drive capstan of a single capstan type of magnetic tape transport system, and the speed of the capstan is sensed by a tachometer or other means. The driving circuit includes a comparator amplifier that delivers a constant starting current of large amplitude to the motor in response to substantial differences between a command signal and the motor speed as sensed by a DC tachometer until the motor reaches a speed which is a predetermined large part of the full speed. When the predetermined speed is reached, the comparator amplifier turns off, and the starting current is rapidly driven against the motor inductance toward the constant speed level. As the motor current decays, the motor speed continues to increase until it closely approaches full speed. When the motor current decays to much less than the constant starting value but slightly greater than the current required to maintain full speed, a constant voltage is applied across the motor. Upon the application of the constant voltage, the motor current decays slightly further and at a slower rate to the current level supplied by the constant voltage, this current level maintaining the motor at substantially constant full speed, independently of the speed signal generated by the tachometer. Therefore, oscillations and noise in the tachometer assembly do not affect the captsan or tape speed.

During constant speed operation the motor is energized by a regulated voltage, which assures close control of motor speed regardless of motor or ambient temperature variations. Inasmuch as a major portion, such as 95%, of the voltage supplied to the motor is employed to overcome back EMF and the load consisting of tape and motor friction is relatively constant, the variations of motor resistance with temperature have little effect on speed and a closely controlled speed, independent of temperature variations is maintained. Additionally, due to the many commutators in the motor, torque ripple is negligible as the armature rotates, and therefore there is very little speed variation due to the commutators. The energization of the motor by a constant current during start and stop operation assures predictable starting characteristics. Inasmuch as the torque produced by a direct current motor is generally proportional to applied current at low motor speeds, a predetermined starting current assures a predetermined starting torque and therefore a predictable capstan rotation and tape distance between start and the attainment of nominal speed. Acceleration and deceleration distances are controlled irrespective of program sequences or temperature of the driven motor. Constant speed characteristics are maintained uniform and independent of tachometer assembly oscillations and motor or ambient temperature variations.

In accordance with another feature of the invention, the constant maintaining voltage is not applied until the large starting current has been driven rapidly to a value only slightly larger than the steady running current. This assures that the constant acceleration may be retained as long as possible without incurring a velocity overshoot.

In another arrangement, the steady state drive may be effected by a restricted bandwidth servo deriving feedback signals from the tachometer. The start-stop control system, however, remains independent of tachometer feedback and oscillatory tendencies.

In accordance with yet another feature of the invention, the motor is driven by a motor drive amplifier whose input includes a summing juntcion. A speed sense amplifier applies a large current to the junction when the motor speed is less than a predetermined percentage of final speed, and during stop operation applies a large current to the junction while the motor speed is greater than a predetermined speed. A current sense amplifier is connected so as to draw current from the junction and reduce current input to the motor drive amplifier. Sufficient current is drawn so that the amplifier supplies the required constant accelerating current to the motor. The current sense amplifier serves another purpose by sensing the motor current and causing the application of the constant speed maintaining voltage when the motor current drops below a predetermined level. Finally, the current sense amplifier, while it is active, increases the output impedance of the motor amplifier, thereby enabling rapid discharge of the motor inductance in the transition from the start to steady run states.

A better understanding of the inevntion may be had by reference to the following detailed description taken in conjunction with the accompanying drawings in which.

Figure 1:
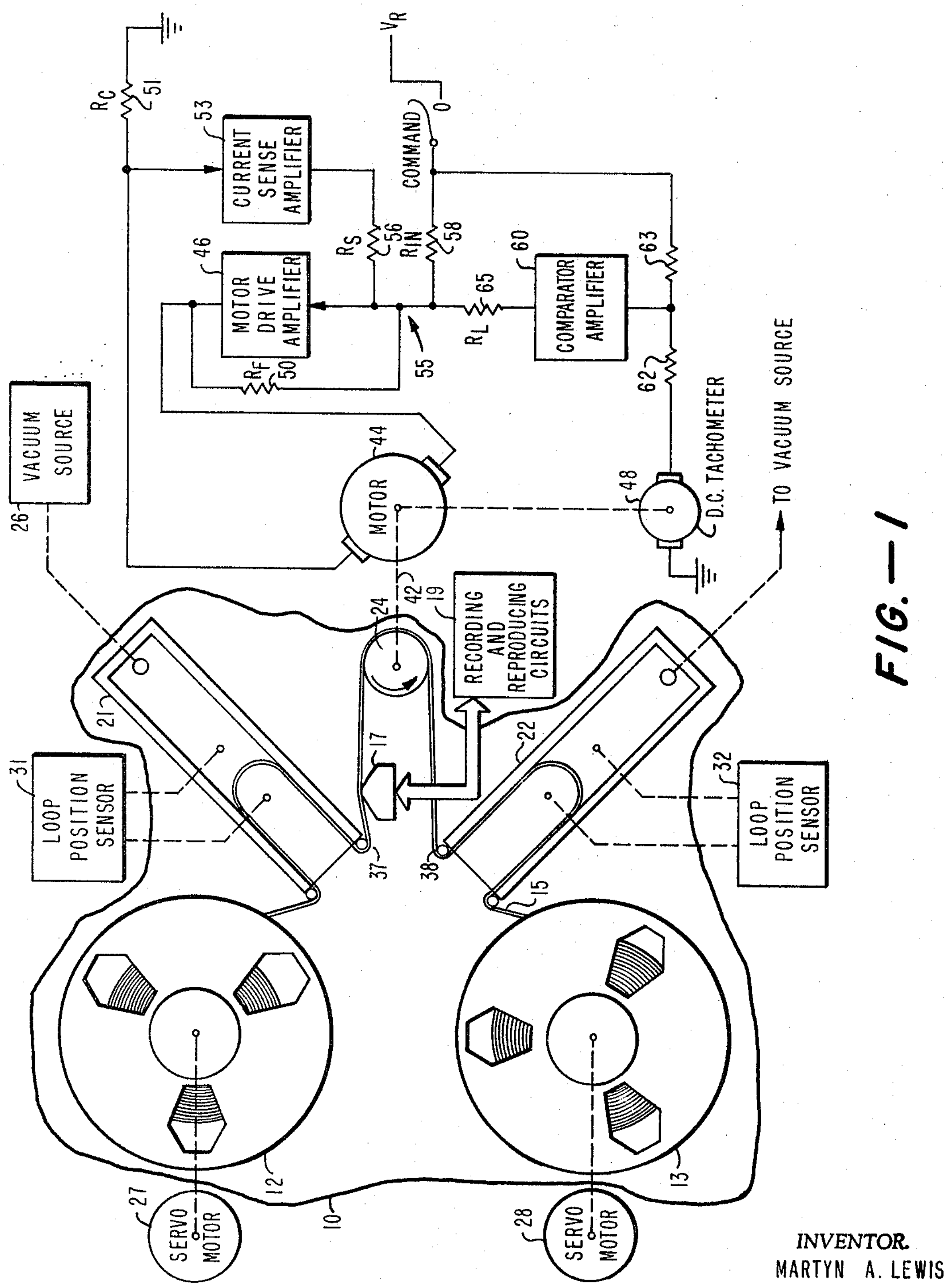
FIG. 1 is a combined, simplified elevation and block diagram representation of a motor drive system in accordance with the present invention used in conjunction with a magnetic tape transport system.

Reference will now be made to FIG. 1 which depicts a typical digital tape transport system such as may employ the motor drive system of the present invention to best advantage. Those details not concerned with particular aspects of the present invention have either been omitted or have been illustrated generally where possible in order to simplify the description.

The mechanical elements of the tape transport system are mounted on a front panel 10, and include a tape supply reel 12 and a tape takeup reel 13. The designations "supply" and "takeup" are used solely for convenience and the tape 15 is moved bidirectionally in a low friction, relatively low tension tape path between the reels. The tape 15 is to be driven in a forward or reverse direction past a magnetic head assembly 17 coupled to recording and reproducing circuits 19, which are interconnected with an associated data processing system (not shown). The data processing system or some other related means provides the signal combinations which constitute the forward, reverse, off and on signals for controlling the tape transport mechanism. Inasmuch as the transfer of data and the provision of these control signals may be achieved by conventional means, no further explanation is provided here.

The tape supply and takeup reels 12 and 13, a pair of vacuum chambers 21 and 22, a centrally disposed drive capstan 24 are arranged symmetrically in a compact configuration on the front panel 10. Each of the vacuum chambers 21 and 22 is positioned between the capstan 24 and a respective one of the reels 12 or 13 to effect decoupling of the tape in the capstan region from the high inertia reels. Each chamber includes a vacuum port coupled to a vacuum source 26 so that the tape may be drawn into the chamber to form a loop of vairable length which constitutes the low inertia buffer nedeed for mechanical decoupling. The capstan 24 may be driven in a regular sequence of forward and reverse motions, but the relatively slower acting reels need not have a similar movement, since the buffer absorbs the relatively fast changes in tape movement between the chambers.

In order to maintain the tape loop lengths within selected limits, each of the reels 12 and 13 is driven by an associated servo motor 27 or 28. Each motor is coupled in a servo loop which derives motor driving signals from a pair of position sensing devices in the sides of the chambers, and if desired, from tape speed tachometers. The loop position sensing devices 31 and 32 comprise light source and photosensitive detector combinations (or similar conevntional units) and provide error signals to the reel servo circuits (not shown). Each of the reel servos controls the movements of a connected reel motor 27 or 28, respectively, so that the reels 12 and 13 are rotated appropriately to withdraw tape from or supply tape to the chambers during operation, so as to tend to maintain the tape within selected ranges or to hold given tape loop lengths. This system for driving the reels 12 and 13, and conventional modifications of this system, such as the use of other forms of loop sensing and servo systems, are well understood by those skilled in the art.

In other respects, however, this tape transport system is materially different from the systems heretofore used, inasmuch as there are no high tension, high friction or high impact forces on the tape. The two chambers 21 and 22 maintain substantially equal tension on the tape. The system is provided with low friction roller guides 37, 38 at the entrance ends of the two chambers 21 and 22 respectively. These roller guides together with the contact areas of the tape at the chamber walls and at the magnetic head assembly produce the only frictional or inertial forces in the tape path to resist tape movement by the capstan 24 in the head region. On the other hand, a highly frictional, and partially resilient drive capstan 24, such as one having a rubber or rubber-like surface, is preferred so that the tension on the tape 15 may be maintained at a relatively low value, such as 0.2–0.6 pound.

The absence of friction in the tape path, along with the presence of low-inertia compliance mechanisms, insures that the tape 15 is driven solely by the action of the capstan 24. In addition, because the tape tension need be only in excess of that level needed to withdraw tape from the capstan 24 during acceleration, the inertia of the motor and capstan is substantially an order of magnitude greater than the inertia and frictional forces along the tape. Thus movement of the motor and capstan are directly determinative of the movement of the tape.

This facility for direct control of the tape movement may be utilized in a cooperative relationship with electronic means for generating signals for the precise control of the start, stop and nominal operating speed characteristics of the tape during movement. The capstan is directly coupled by a motor shaft 42 to a low inertia motor 44, such as the DC type of motor containing a cylindrical basket rotor surrounding a slug of iron which does not rotate with the rotor. This type of motor is preferred for the high performance tape transport application, because it not only has low armature inertia, but also has a substantially linear torque vs. current characteristics over a relatively wide range. It has a higher inductance than the planar rotor motor but has three times the torque sensitivity per unit rotor inertia. Thus, when coupled to a mechanical system having a very low and substantially constant counter-torque, the magnitude and polarity of the applied current may be used to actively and completely control the operation of the mechanical system. A linear characteristic is not needed, however, as long as the torque characteristic continues to increase with increasing current.

In accordance with the invention, a motor drive circuit is provided that energizes the capstan motor 44 in two distinct modes. In the transient or start-stop modes, large substantially constant accelerating and decelerating currents are applied to the motor, whereas in the constant speed mode, a constant voltage is applied. A further feature of the invention is the use of a definite and rapid control of the current variation during switching between the constant current and constant voltage states.

The drive circuitry for controlling the motor from a motor drive amplifier 46 is shown in generalized form in FIG. 1. The two input signals provided to this system are the command signals, $V_r$, and a DC signal from a DC tachometer 48 which is mechanically coupled to the motor-capstan assembly. The command signals may be, as described below, provided on two or more input lines, but only one is illustrated here inasmuch as the essential command function is the provision of a reference voltage, $V_r$, for the system. Two feedback signals are provided for the motor drive amplifier 46, one being a voltage feedback derived from a circuit point intermediate the amplifier 46 and the motor 44, and establishing a feedback path through a feedback resistor ($R_f$) 50. The second feedback path provides a current representative of motor current, derived from a sensing device such as a resistor 51 (designated $R_c$) and coupled through a current sense amplifier 53 to a summing junction 55 at the input terminal of the motor drive amplifier 46. The current sense amplifier 53 has a defined deadband and defined voltage gain, and is coupled to the summing junction 55 through a summing resistor 56 ,designated $R_s$). The input signal is provided to the summing junction through an appropriate resistor ($R_{in}$) 58.

A separate control signal for this system is derived from a comparator amplifier 60 which sums the signal derived from the DC tachometer 48 and the input signal $V_r$ through an appropriate pair of resistors 62, 63. The output signal from the comparator amplifier 60 is coupled to the summing junction 55 through an appropriately selected resistor 65 (designated $R_L$).

In this system, torsional oscillations in the capstan-motor-tachometer train are not excited as they would be if the tachometer voltage were coupled back to the input. The use of heavy damping in the servo system would of course introduce excessive lengthening of the acceleration and deceleration intervals during start-stop modes. In accordance with the invention, the difficulties are overcome by operating the motor drive amplifier 46 in two different modes, in one of which a substantially constant current is applied for acceleration and deceleration, and in the other of which a constant voltage is applied for speed control under steady state conditions. The current sense amplifier 53 is coupled in the current sense resistor 51 circuit, and has a defined deadband and defined voltage gain which provides a current feedback to the motor drive amplifier 46 when the motor current is slightly greater than the current taken at steady speed. Voltage feedback is derived from the feedback resistor 50. The current sense amplifier 53 is arranged to sense currents above a value slightly greater than that which flows in the motor during constant speed operation, and is further arranged to limit the current driven into the motor 44 to a value proportional to the total current driven into the summing junction 55 during start and stop. The comparator amplifier 60 is arranged to deliver a relatively large current into the summing junction 55 whenever the tachometer voltage differs from the command signal, $V_r$, by a specified amount, such as approximately 20%. Otherwise, the comparator amplifier 60 provides essentially zero output signals.

When operating in the transient phases, in response to a step change in the command signal, $V_r$, a large steady current is delivered to the summing junction 55 from the comparator amplifier 60. On starting, the signal from the tachometer 48 will initially be substantially zero and the command signal will step to full amplitude, so that the summation of the signals through the resistors 62, 63 activates the comparator amplifier 60 and delivers a relatively large steady current to the summing junction. A large accelerating current is also delivered through the motor drive amplifier 46 to the motor 44. The motor drive current, however, saturates at some constant level corresponding to equilibrium of the currents at the summing junction 55. A heavy feedback signal is derived from the current sense amplifier 53 and returned to the summing junction, in a negative feedback sense, so that current generated by the comparator amplifier 60 tends to flow through the resistor 56 at the output terminal of the current sense amplifier 53. The current flow through the resistor 56 establishes the voltage level at the output terminal of the current sense amplifier 53, and therefore determines the voltage level at the input of the current sense amplifier 53, because the amplifier has, as previously stated, a defined voltage gain. Accordingly, the potential difference across the $R_c$ resistor 51 is fixed, establishing a saturated current level for the motor 44 under these conditions.

Because the constant current delivered to the motor 44 produces a constant torque, the motor 44 accelerates linearly and predictably to its final speed. Acceleration is independent of motor resistance, and relatively independent of friction in the load, because as previously described the frictional torque is very much lower than the acceleration torque required for the inertial load.

The saturated current level is maintained and the acceleration is held substantially constant until the motor 44 is within the effective deadband of the comparator amplifier 60, at which point the comparator amplifier is switched off. This level is chosen at a predetermined point, as approximately 80% of the final or nominal tape speed. On the activation of the comparator amplifier 60, the current fall time would normally depend upon motor inductance, motor resistance and the relative level of the current at the initiation of the interval. The current sense amplifier 53 continues active for a time, however, maintaining a high output impedance to the motor, thus driving the motor current in a descending fashion and in a rapid manner until the deadband of the current sense amplifier 53 is reached. Thus the current fall time is made quite short, the acceleration rate, however, decreases as the desired steady state rate is approached, and the deadbands of the comparator amplifier 60 and the current sense amplifier 53 are so adjusted that an optimum start characteristic is achieved. That is, the capstan 24 and the tape 15 are moving at a decreasing acceleration within a brief interval until the nominal operating speed is almost reached, at which time the system settles into the steady state mode without transients or oscillatory hunting of the desired speed.

During steady state operating conditions, the motor drive amplifier 46 operates only with the voltage feedback derived from the feedback resistor 56 path, so that a regulated voltage is maintained across the motor 44 terminals. The motor 44 runs under a constant load, involving friction in the tape path and friction in the motor, with only a relatively small voltage drop across the armature resistance. Under these conditions, the back EMF of the motor 44 is approximately 95% of the applied voltage, and the armature resistance voltage drop furthermore remains relatively constant. The result is that the speed of the motor 44 is substantially constant. Short term speed variations, due to commutators are quite small with this kind of motor. In one practical high performance system in accordance with the invention, the motor speed is maintained within close limits irrespective of temperatures and time variations. In the practical system referred to, it has been established that the tachometer 48 output voltage varies substantially in an oscillatory fashion with a closed loop servo, but these oscillatory variations are almost eliminated using the special techniques described. It will also be recognized that oscillatory movements in the tachometer 48 also might appear in a servo-controlled start-stop condition. Under these transient phases of operation, however, the servo is saturated, or in a zero gain mode, and the now smaller oscillations of the tachometer voltage are rejected since they remain within the large deadband of the comparator amplifier 60.

When the system is operating in the stop mode, the command signal varies in an opposite-going sense, but the system operation is effectively the same as in the start mode. That is, the sensing of a large signal difference between the command signal and the tachometer 48 signal activates the comparator amplifier 60, and the servo establishes a saturated current level to drive the motor 44. As the tachometer 48 signal decreases to within the selected proportion relative to the command signal level, the comparator amplifier 60 switches off, and the current sense amplifier 53 drives the current down until its deadband is reached, and the inherent decay characteristics effect final and complete stopping. Operation in the reverse direction merely involves application of input signals of opposite polarity to those described above.

Figure 2:
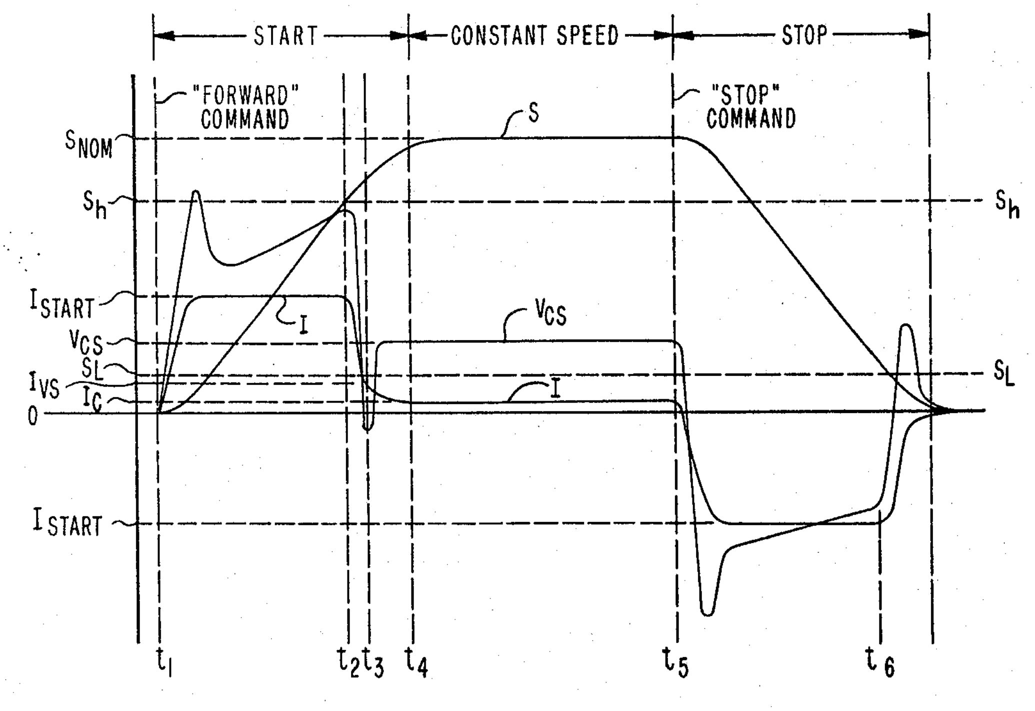
FIG. 2 is a graphical showing of variations with respect to time of motor current voltage and speed, illustrating the characteristic operation of motor drive systems in accordance with the invention.

Reference may now be made to FIG. 2, which illustrates the ariations of motor speed, voltage and current during start, constant speed and stop operations. It is assumed for purposes of illustration that at a particular time $T_1$ a "forward" command in the form of a negative going reference voltage is delivered to the summing junction 55 and to the comparator amplifier 60 of FIG. 1. The comparator amplifier 60 and the current sense amplifier 53 operate as previously described to establish a saturated current level, designated $I_{start}$, so that the motor speed S increases at a substantially linear rate. As the motor speed increases, the tachometer 48 returns a steadily increasing voltage to the comparator amplifier 60, until a predetermined proportion of the command signal is attained at time $T_2$. At this time, the comparator amplifier 60 is deactivated, and in response to the much reduced summing junction current, the current sense amplifier 53 acts rapidly to drive the current and voltage in a negative going fashion, until the operating point or deadband of the current sense amplifier 53 is reached at the level $I_{vs}$. Thereafter, the motor current is permitted to decay at the rate determined by motor inductance and resistance, with constant regulated level $V_{cs}$ maintained during steady state operation. This constant voltage level $V_{cs}$ is substantially entirely back EMF, as previously described, and the current maintained is only that required to overcome frictional, resistance and windage losses.

The stop command applied under these circumstances is merely a return of the reference voltage in a step function fashion to the zero or reference voltage level. When this happens the voltage is driven sharply negative as the comparator amplifier 60 again becomes activated and a negative going, almost constant current pulse is generated for deceleration. The current level is maintained at an appropriate negative level, designated $-I_{start}$. At the point at which the comparator amplifier 60 becomes deactivated, designated $T_6$, the voltage begins a sharp negative kickback to discharge motor inductance and the current falls sharply to the point at which the current sense amplifier 53 enters its deadband. Thereafter, normal current decay quickly brings the motor 44 to a stop.

Figure 3:
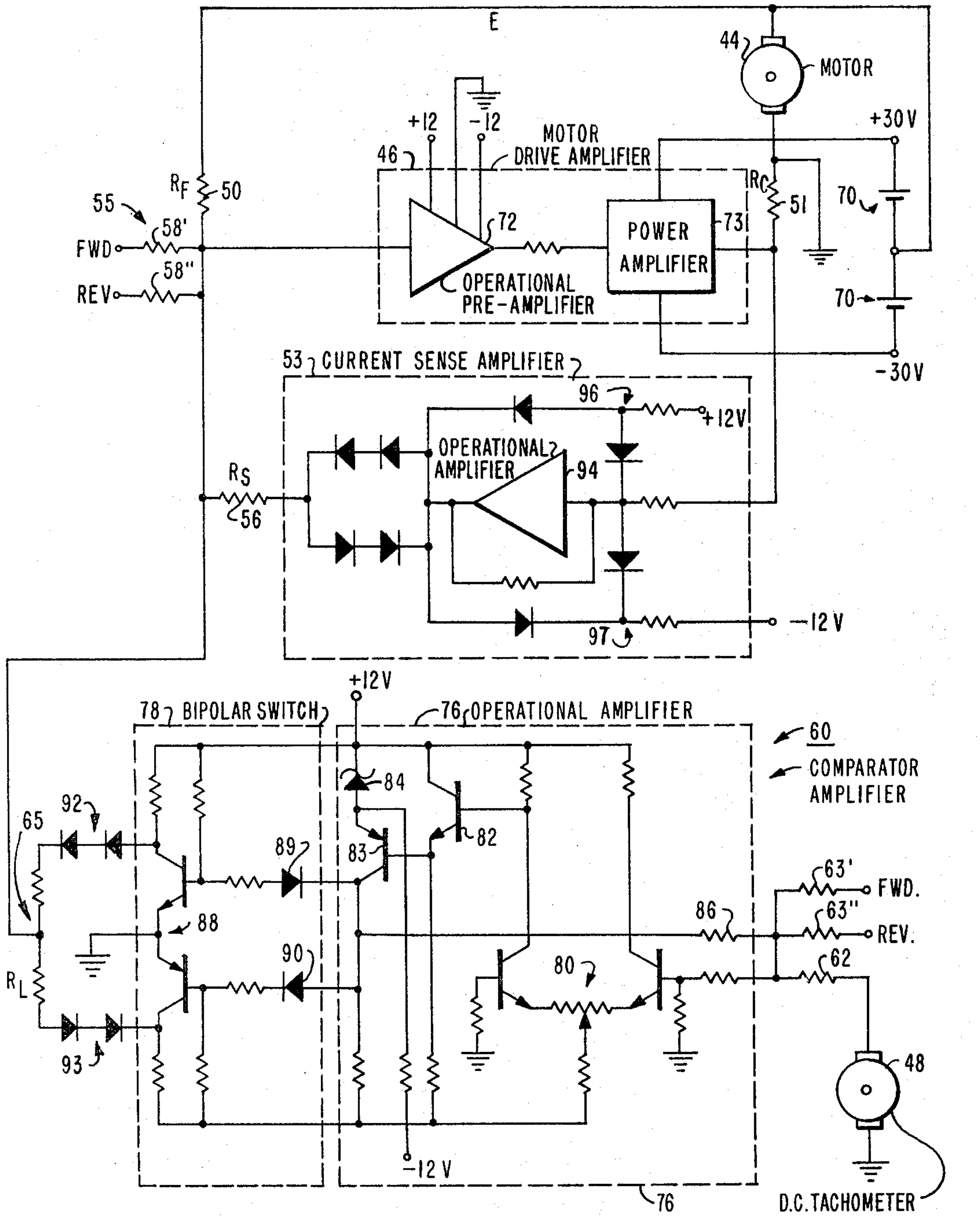
FIG. 3 is a combined block and schematic circuit diagram of a specific example of a motor drive system constructed in accordance with the invention.

A specific example of a circuit in accordance with the invention is provided in FIG. 3, in which the elements broadly identified in FIG. 1 are correspondingly designated. It should be noted that the various amplifiers and their disposition correspond to those of FIG. 1, and that the circuits are essentially alike, except for greater detail and certain alternatives which are obvious to those skilled in the art. For example, in FIG. 3 the command signals are shown as being provided on separate input lines, designated forward and reverse respectively, being negative and positive respectively. Zero on both these lines is a stop signal. In addition, the voltage feedback path is taken from the center reference point of a double-ended power supply 70 which is coupled to one terminal of the motor 44. This feedback path provides an identical function to that shown in FIG. 1, wherein the motor 44 is shown diagrammatically as coupled to a fixed ground point. The current path from either end of the power supply 70 through the power amplifier and current sensing resistor 51 and through the motor 44 is the effective equivalent of the simplified representation of FIG. 1, although certain advantages are achieved in practice, as will be understood by those skilled in the art.

The unit designated motor drive amplifier 46 is divided into two principal stages, an operational preamplifier 72, which may be of the form shown more specifically in conjunction with the comparator amplifier 60, and a power amplifier 73. The power amplifier 73 generates the drive currents of appropriate amplitude and of either polarity for energizing the motor, and is coupled to the power supply 70, which may be understood to consist of a full wave rectifier coupled through appropriate capacitor banks for filtering to remove ripple effects. It will also be recognized that the arrangement of the summing junction 55 to receive both the command signals and the voltage feedback through the feedback resistor 50, establishes an effectively regulated voltage source when the remaining signals generated by the current sense amplifier 53 and the comparator amplifier 60 are inactivated.

A specific example of a suitable operational amplifier is provided by the operational amplifier 76 shown within the comparator amplifier unit 60 of FIG. 3. This amplifier 76 may be utilized in each of the correspondingly designated units employed elsewhere in FIG. 3, and drives what may be termed a bipolar switch 78 to generate positive and negative signals of equal amplitude, depending upon the selected amplitude relation between the reference signals and the tachometer signals, or to be inactivated in its deadband when the tachometer signal is within a given range of proportionality relative to the reference signal then being supplied. Detailed description of the operational amplifier will not be provided, inasmuch as any suitable expedient may be used, although the circuit shown has been found to be advantageous. The input signals derived through the various summing resistors 62, 63′ and 63″ are applied to the base of a first transistor in a differential amplifier pair 80, and the differentially amplified output signals are successively passed through an emitter follower transistor 82 and an inverter amplifier transistor 83. A Zener diode 84 is coupled in the emitter circuit of the inverter amplifier transistor 83 to provide improved drift performance. The summing junction point at the input terminal of the comparator amplifier 60 is also coupled through a relatively large resistor (e.g., 33 kilohms) 86 to the collector of the inverter amplifier transistor 83. This defines the gain of the operational amplifier. The output signal derived from the operational amplifier 76 varies bidirectionally, to cut off, at definite voltage levels, either of a pair of normally conducting transistors coupled in a complementary symmetry circuit 88 in the bipolar switch 78. Each of the transistors is coupled through an appropriately poled diode 89 or 90 and is biased in a symmetrical fashion, so that only one is cut off at a time, dependent upon a voltage swing at the terminal coupled to both of the diodes 89, 90 of the appropriate polarity and in excess of a predetermined amplitude. This amplitude, in conjunction with the defined amplifier gain, therefore determines the point at which the comparator switches. Signals derived from either half of the pair of complementary symmetry transistors 88 are reunited by summation through two pairs of back-to-back diodes 92, 93 which prevents current flow in the off state due to possible DC offsets. It is convenient to divide the summing resistor 65 into opposite halves, as shown, to combine and feed the signal to the summing junction 55.

The current sense amplifier 53 uses an operational amplifier 94 of similar form, and includes back-to-back diode pairs as previously described. It is advantageous to establish the deadband for this circuit in a definitive fashion by utilizing two shunt pairs of diodes 96, 97. When arranged in this fashion, the shunt diode pairs 96, 97 define preselected and fixed deadband limits for the current sense amplifier 53.

Accordingly, FIG. 3 shows an arrangement in which operational points and deadbands for the current sense amplifier 53 and the comparator amplifier 60 may be precisely defined with relation to each other and with relation to the servo system. The operational point or deadband of the comparator amplifier 60 is established by the proportional relation of the signals applied to the command inputs and the speed signal derived from the tachometer 48. Typically, as previously described in conjunction with FIG. 2, a speed signal which is greater than approximately 70%–90% of the reference signal will return the bipolar switch to the "off" position, deactivating the comparator amplifier 60. In effect, therefore, the comparator amplifier 60 will be in its deadband when the tape speed approaches (by 70%–90% in this example) the desired speed, either forward, reverse or stationary.

The deadband of the current sense amplifier is, as previously shown in conjunction with FIG. 2, substantially narrower and will typically be entered when the tape speed is within a relatively few percent of the desired nominal speed.

A further explanation of the arrangement and relationship of the resistors which are coupled to the summing junction 55 may be useful. Typically, the feedback resistor 50 ($R_f$) will be substantially greater than the resistor 56 ($R_s$) coupled to the current sense amplifier 53. During the transient phases of operation, the current from the comparator amplifier will be substantially greater than the input current. Under these conditions, most of the current will be driven into the resistor 56. With the output signal from the current sense amplifier 53 thus defined, the voltage level at the terminal coupled to the motor 44 is also precisely defined, and the constant voltage level establishes a constant current in motor 44, at the current saturation level desired for the servo, until the transient phase ceases. Neither the current sense amplifier 53 nor the comparator amplifier 60 affect the regulated voltage and current which drive the motor 44 during steady state operation, since both are then inactive.

Figure 4:
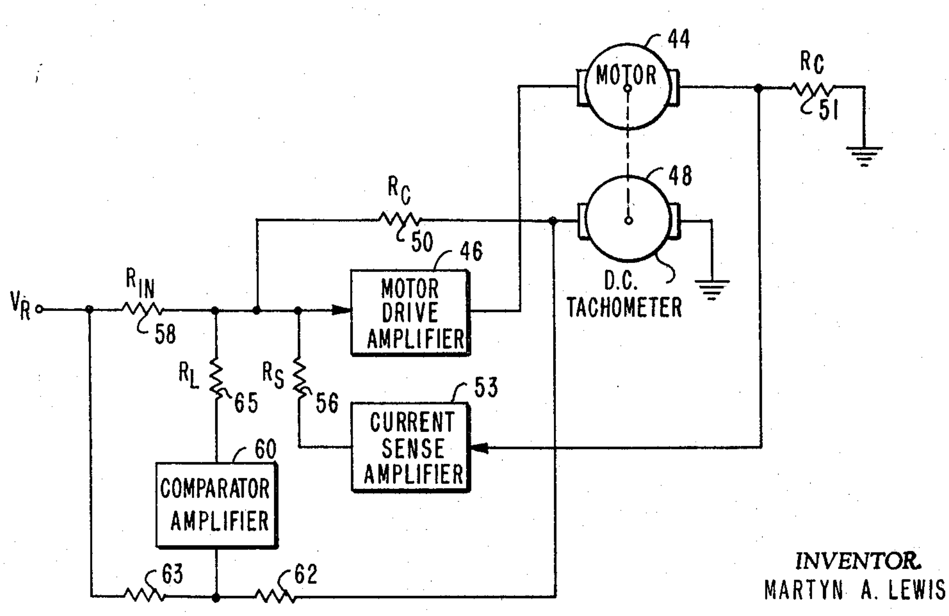
FIG. 4 is a block diagram of an alternative example of a system in accordance with the invention.

The system described performs in a manner which is relatively free from ambient temperature variations or motor resistance variations. The system is to be contrasted therefore to a voltage saturated servo, wherein the torque during the start period is not constant for the duration of the start period, and wherein the torque varies with motor armature resistance changes which occur due to motor heating. Additionally, in a voltage saturation servo, the current in the motor decays so slowly that velocity overshoots are encountered unless a very rounded velocity start profile is tolerated. It will also be realized that various other expedients in accordance with the invention may be utilized to take advantage of the different modes of operation which are feasible in accordance with the invention. As one example, referring now to FIG. 4, the system may employ a servo loop of limited bandwidth operated from the tachometer 48 signal during steady state modes. In this system the drive amplifier 46 voltage feedback is taken from the tachometer 48, but the remainder of the system is essentially the same. The bandwidth of the servo is defined by shaping the response of the drive amplifier 46 in conventional fashion, but in accordance with the following considerations.

If oscillations occur at some frequency, say at 1 kc., then the servo bandwith (i.e., the frequency at which the loop gain falls to unity, sometimes called the unity gain point), will generally have to be restricted to a small fraction of the given frequency. Generally, this will be approximately one-tenth of the frequency, or 100 c.p.s. in this instance. This bandwidth is not adequate to track a ramp waveform during start-stop in the ramp generator type servo, but is sufficient for steady state operation. Therefore, transient phases are controlled as described above in conjunction with FIG. 1. On starting, for example, the waveforms are those of FIG. 2 until time $T_3$, at which point the servo comes under control of the signal from the tachometer 48 to maintain constant speed.

Although a number of modifications and alternative forms in accordance with the invention have been shown, it should be appreciated that many other modifications and changes are feasible within the scope of the invention. Accordingly, the invention is to be construed as including all alternative forms falling within the scope of the appended claims.

What is claimed is:

1. In a motor drive system having a means for sensing speed which is subject to independent oscillatory variations, an arrangement for predictable control of acceleration, deceleration and steady state operation including the combination of means providing a command signal, comparator means responsive to the command signal and the speed sensing means for generating a first signal in response to given differences between the applied command and speed signals, a bidirectional motor to be driven, motor drive amplifier means coupled to receive the first signal and to drive the motor, and means responsive to motor current and coupled to provide a negative feedback signal to the motor drive amplifier means to establish motor current at preselected substantional constant levels during acceleration and deceleration.

2. A DC bidirectional motor drive system for control of both transient and steady state phases of operation and including the combination of a DC bidirectional motor, speed signal generating means coupled to the DC motor, motor drive amplifier means coupled to the motor, first feedback means including means for sensing the motor current and for providing a current feedback signal to the motor drive amplifier means, the first feedback means including predetermined voltage gain means, second feedback means coupled to provide voltage feedback signal for the motor drive amplifier means, means providing a command signal, and comparator means having a predetermined deadband and responsive to the command signal and to the speed signal for providing a driving signal to the motor drive amplifier means when the command signal is less than a predetermined ratio to the speed signal.

3. The invention as set forth in claim 2 above, wherein the first feedback means operates in conjunction with the comparator means to establish a saturated current level at the motor until the predetermined ratio is reached, and wherein the first feedback means has a narrower deadband than the comparator means, and is arranged to drive the motor current affirmatively and rapidly toward a steady state level after deactivation of the comparator means.

4. In a motor driven system including speed sensing means mechanically coupled to a DC motor for generating speed signals which are subject to to oscillatory variations, a system for driving the motor preciely during both transient and steady state modes of operation including the combination of motor drive amplifier means coupled to the motor, the motor drive amplifier means including voltage feedback means for providing a regulated output voltage signal in response to an applied command signal, and means for driving the motor drive amplifier means during transient phases of operation, said last mentioned means including a pair of amplifier means, a first of the amplifier means being operative in response to relatively large differences between the applied motor signal and the speed signal, the second of the amplifier means being responsive to motor current and coupled in opposition to the first amplifier means, the second amplifier means becoming inoperative at relatively small differences between the actual and desired motor speed.

5. A motor drive system for operating a motor in response to applied command signals for providing acceleration, deceleration and steady state control, including the combination of means coupled to the motor for providing a speed signal, drive amplifier means coupled to the motor and coupled to receive the command signal, first amplifier means responsive to the differences between the command signal and the speed signal and having a relatively wide deadband relative to the speed variation of the motor, the first amplifier means being coupled to provide drive signals to the drive amplifier means, and second amplifier means responsive to motor current and also coupled to provide drive signals to the drive amplifier means, and second amplifier means providing a signal in opposition to the signal from the first amplifier means and having a substantially narrower deadband relative to variations in motor speed.

6. In a digital magnetic tape transport system having a single capstan that is directly driven by a direct current motor having a substantially linear torque versus current characteristic, and including tachometer means coupled in a mechanically oscillatory capstan-motor-tachometer train, a system for providing controlled acceleration, deceleration and steady state movement of the tape including the combination of power amplifier means coupled to the DC motor, means coupled to the power amplifier means and the motor and providing a floating DC supply, current sensing resistor means coupled in the motor winding circuit, preamplifier means coupled to the power amplifier means, voltage feedback means coupling the output circuit of the power amplifier means to the summing junction means, means providing command signals to the summing junction means, comparator amplifier means including summing junction means responsive to the command signals and to the tachometer signals, the comparator amplifier means providing output signals of predetermined amplitude and polarity in response to signal differences greater than a predetermined ratio between the tachometer signals and the command signals, the output signals being applied to the summing junction means, current sensing amplifier means coupled to the current sense resistor means and having defined voltage gain, the current sense amplifier means providing a current feedback signal to the summing junction means and arranged in proportion to the comparator amplifier means to establish a saturated drive current level for the motor when the output signal from the comparator amplifier means is provided, the current sense amplifier means being operative in response to motor currents greater than a predetermined level which is substantially less than the saturation current level, such that the current sense amplifier means drives the current level toward a steady state level from the saturation current level maintained during acceleration and deceleration intervals.

7. In a digital magnetic tape transport system having a single capstan that is directly driven by a direct current motor having a substantially linear torque versus current characteristic, and including tachometer means coupled in a mechanically oscillatory capstan-motor-tachometer train such that tachometer oscillations of a given frequence are present, a system for providing controlled acceleration, deceleration and steady state movement of the tape including the combination of power amplifier means coupled to the DC motor, means coupled to the power amplifier means and providing a double-ended floating DC supply having a center reference point coupled to the motor, current sensing resistor means coupled in the motor winding circuit, preamplifier means coupled to the power amplifier means, servo summing junction means coupled to the preamplifier means, voltage feedback means coupling the output circuit of the power amplifier means to the summing junction means, means providing command signals to the summing junction means, comparator amplifier means including summing junction means responsive to the command signals and to the tachometer signals, the comparator amplifier means providing an output signal of predetermined amplitude and polarity in response to signal differences greater than a predetermined ratio between the tachometer signals and the command signals, the output signals being applied to the summing junction means, current sensing amplifier means coupled to the current sense resistor means and having defined voltage gain, the current sense amplifier means providing a current feedback signal to the summing junction means and arranged with the comparator amplifier means to establish a saturated drive current level for the motor when the output signal from the comparator amplifier means is provided, the current sense amplifier means having a relatively narrow deadband such that the current sense amplifier means drives the current level toward a steady state level from the saturation current level maintained during acceleration and deceleration intervals, and the voltage feedback means and power amplifier means maintaining the motor current at a regulated level during constant speed operation.

8. A motor drive system comprising: a motor; a drive amplifier coupled to the motor; tachometer means connected to said motor for sensing the speed of said motor; current supply means connected to said tachometer means for supplying a predetermined accelerating current to said drive amplifier when the speed of said motor, as sensed by said tachometer means, is less than a predetermined speed; said motor, said tachometer means, and said current supply means forming a feedback servo loop having a predetermined response time; and constant speed energizing means connected to said motor for applying constant speed energizing signals to said motor which are substantially constant over periods of time of the order of magnitude of said predetermined response time of said servo loop and oscillatory characteristics of said tachometer means, whereby said motor is rapidly accelerated to a desired constant speed in a closely controlled manner and is maintained at said desired speed independently of rapid oscillations of said tachometer means.

9. A motor drive system as defined in claim 8 wherein said constant speed energizing means is a regulated voltage supply whose output is independent of the actual motor speed.

10. A motor drive system as defined in claim 8 wherein said constant speed energizing means includes feedback means coupling the tachometer means to the drive amplifier means.

11. A motor drive system comprising: a motor having an output torque substantially proportional to the input current applied thereto; motor energizing means for providing energizing signals to said motor responsive to input signal control parameters, said motor energizing means including means for establishing regulated voltage in response to input signals; summing junction means for applying to said motor energizing means a drive signal having a control parameter proportional to the algebraic sum of input signal control parameters applied to said summing junction, and current supply means for providing acceleration control signals to said summing junction means only when the speed of said motor is less than a predetermined proportion being substantially less than the desired full speed.

12. In a motor drive system having a means for sensing speed which is subject to independent oscillatory variations, an arrangement for control of acceleration, decelartion and steady state operation including the combination of means providing a command signal, means responsive to the command signal and the speed sensing means for generating a first signal in response to given difference proportions between the command and speed signals, a motor to be driven, motor drive amplifier means coupled to receive the first signal and to drive the motor, means responsive to motor current and coupled to provide a negative feedback signal to the motor drive amplifier means to maintain the current through the motor at a selected level during acceleration and deceleration, and means responsive to the speed sensing means for providing a feedback signal to the motor drive amplifier means.

13. A motor drive system for the capstan of a single capstan magnetic tape transport including tachometer means coupled to the motor, the capstan-motor-tachometer train having an oscillatory characteristic in a known frequency range, servo amplifier means having a unity gain point at a frequency substantially less than the known frequency range and coupled to the motor, means responsive to the tachometer means and coupled to the servo amplifier means for maintaining selected servo saturation current levels through the motor in response to start-stop commands, and means coupling the tachometer means to the servo amplifier means to provide speed regulation during steady state conditions.

14. A motor control system for driving the tape in a digital magnetic tape transport system of the single capstan type with controlled acceleration, deceleration and steady state operation, comprising a DC motor having a high torque-to-inertia ratio coupled to the capstan, servo summing junction means, means providing reference signals denoting start, stop and steady state operation and coupled to the summing junction means, DC tachometer means mechanically coupled to the capstan and motor in a train having oscillatory tendencies, comparator amplifier means coupled to provide an output signal to the summing junction means, the comparator amplifier means including means for summing the tachometer signal and the reference signal, and an operational amplifier coupled to control a bipolar switch means, the summing means, operational amplifier and bipolar switch means being arranged to provide an output signal of selected amplitude and appropriate polarity when the motor speed is less than approximately 80% of the desired speed, as indicated by the reference signal, current sense amplifier means coupled to the motor winding circuit and in a negative feedback sense to the summing junction means, the current sense amplifier means being operative except when the motor speed is within a relatively few percent of the desired speed, motor drive amplifier means including a preamplifier coupled to the summing junction means, and a power amplifier coupled to the motor and the preamplifier, and voltage feedback means coupling the output terminal of the power amplifier to the summing junction means to maintain a regulated voltage at the motor when the motor speed is such that the comparator amplifier means and current sense amplifier means are not in their operative ranges.

References Cited

UNITED STATES PATENTS

| | | | |
|---|---|---|---|
| 2,911,580 | 11/1959 | Gould et al. | 318—317 |
| 2,965,823 | 12/1960 | Wolman | 318—20 |
| 3,046,464 | 7/1962 | Miller | 318—331 |

ORIS L. RADER, *Primary Examiner.*

J. J. BAKER, *Assistant Examiner.*

UNITED STATES PATENT AND TRADEMARK OFFICE

CERTIFICATE OF CORRECTION

PATENT NO. : 3,383,578

DATED : May 14, 1968

INVENTOR(S) : Martyn A. Lewis

It is certified that error appears in the above-identified patent and that said Letters Patent are hereby corrected as shown below:

Col. 5, line 53, between "lar" and "units", "conevntional" should read --conventional--. Col. 8, line 64, between "the" and "of motor", "ariations" should read --variations--. Col. 11, claim 1, line 70, between "preselected" and "constant", "substantial" should read --substantially--. Col. 12, claim 2, line 6, between "provide" and "voltage" insert --a--; claim 5, line 55, between "means," and "second", "and" should read --the--; claim 6, line 72, after "means to", "the" should read --a--; claim 6, line 74, between "nals to" and "summing", "the" should read --a--. Col. 14, claim 11, line 20, between "establishing" and "regulated" insert --a--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*